(12) United States Patent
Guccione et al.

(10) Patent No.: US 6,836,842 B1
(45) Date of Patent: Dec. 28, 2004

(54) METHOD OF PARTIAL RECONFIGURATION OF A PLD IN WHICH ONLY UPDATED PORTIONS OF CONFIGURATION DATA ARE SELECTED FOR RECONFIGURING THE PLD

(75) Inventors: Steven A. Guccione, Austin, TX (US); Scott P. McMillan, Santa Clara, CA (US)

(73) Assignee: Xilinx, Inc., San Jose, CA (US)

( * ) Notice: Subject to any disclaimer, the term of this patent is extended or adjusted under 35 U.S.C. 154(b) by 653 days.

(21) Appl. No.: 09/841,270

(22) Filed: Apr. 24, 2001

(51) Int. Cl.[7] .............................................. G06F 9/318
(52) U.S. Cl. .......................... 713/100; 716/16; 714/16
(58) Field of Search ............................ 716/16; 714/16; 713/100

(56) References Cited

U.S. PATENT DOCUMENTS 5,524,205 A * 6/1996 Lomet et al. ................. 714/16
5,946,219 A * 8/1999 Mason et al. ................. 716/16

* cited by examiner

Primary Examiner—Thomas Lee
Assistant Examiner—Pranav Chandrasekhar
(74) Attorney, Agent, or Firm—LeRoy D. Maunu

(57) ABSTRACT

Automatic tracking and assembly of changed portions of configuration data for partial run-time reconfiguration of a programmable logic device (PLD). The methods of an API that supports run-time reconfiguration applications for a PLD manage configuration data for partial reconfiguration. The API saves in application memory a copy of the configuration data used to configure the PLD. As the application updates selected portions of the in-memory configuration data, the API tracks which portions of the configuration data changed. When the application initiates reconfiguration of the PLD, the API partially reconfigures the PLD with the tracked changed portions of the configuration data. For readback of configuration data from the PLD, the API tracks which portions of in-memory configuration data are synchronized with the PLD.

16 Claims, 4 Drawing Sheets

METHOD OF PARTIAL RECONFIGURATION OF A PLD IN WHICH ONLY UPDATED PORTIONS OF CONFIGURATION DATA ARE SELECTED FOR RECONFIGURING THE PLD

GOVERNMENT CONTRACT

The U.S. Government has a paid-up license in this invention and the right in limited circumstances to require the patent owner to license others on reasonable terms as provided for by the terms of DABT63-3-0004 awarded by DARPA.

FIELD OF THE INVENTION

The present invention generally relates to configuration of programmable logic devices (PLDs), and more particularly to partial run-time reconfiguration of PLDs.

BACKGROUND

Usage of programmable logic devices (PLDs), in particular, field programmable gate arrays (FPGAs), is expanding from implementation of static circuit designs to in-system, run-time reconfiguration (RTR) applications. The field of reconfigurable computing has advanced steadily for the past decade, using FPGAs as the basis for high-performance reconfigurable systems. Run-Time Reconfigurable (RTR) systems distinguish themselves by performing circuit logic and routing customization at run-time. RTR systems using FPGAs are expected to result in systems that require less hardware, less software, and fewer input/output resources than traditional FPGA-based systems.

For runtime reconfigurable applications to proliferate, designers must have access to tools that support the development of such applications. JBits software from Xilinx, for example, provides an environment for designing and deploying applications that support runtime reconfiguration. JBits provides a Java-based application programming interface (API) for generating configuration data, loading the configuration data into an FPGA, and reading back configuration and state data from the FPGA. Thus, portable run-time reconfiguration applications can be developed using object-oriented techniques.

With RTR systems, the time required to generate the programming bitstream may be critical from the viewpoint of a user who is waiting for the FPGA to be reconfigured, as compared to traditional configuration of FPGAs where the time taken to generate a programming bitstream is generally not real-time critical. Thus, it may be acceptable in traditional implementation scenarios to take hours to generate a programming bitstream using traditional configuration methods. In an RTR environment, however, it is expected that the reconfiguration process require no more than a few seconds or even a fraction of a second.

Some FPGAs, for example, Virtex® FPGAs from Xilinx, are partially reconfigurable, which assists in reducing the time required for reconfiguration. For some design changes only a small portion of the configurable resources change. Thus, reconfiguring the entire device to implement such changes would be unnecessarily time consuming. With partial reconfigurability, the capability is provided to configure only those portions needing configuration.

Partial reconfigurability is especially important in a run-time reconfiguration application since reconfiguration is performed at runtime. Accessible and efficient support of partial reconfiguration capabilities at the application program level are essential for the development of new run-time reconfiguration applications.

A system and method that address the aforementioned problems, as well as other related problems, are therefore desirable.

SUMMARY OF THE INVENTION

In various embodiments, the invention supports partial run-time reconfiguration applications for programmable logic devices (PLDs). The methods of an API that supports run-time reconfiguration applications manage configuration data for partial reconfiguration, and the API saves in application memory a copy of the configuration data used to configure the PLD. As the application updates selected portions of the in-memory configuration data, the API tracks which portions of the configuration data changed. When the application initiates reconfiguration of the PLD, the API partially reconfigures the PLD with the tracked changed portions of the configuration data. For readback of configuration data from the PLD, the API tracks which portions of in-memory configuration data are synchronized with the PLD.

It will be appreciated that various other embodiments are set forth in the Detailed Description and claims which follow.

BRIEF DESCRIPTION OF THE DRAWINGS

Various aspects and advantages of the invention will become apparent upon review of the following detailed description and upon reference to the drawings in which.

DETAILED DESCRIPTION

Various embodiments of the present invention are described in terms of the JBits API and Virtex FPGAs from Xilinx. However, those skilled in the art will appreciate that the invention could be implemented in other programming languages and applied to programmable logic devices (PLDs) other than FPGAs depending on system requirements. Thus, references to JBits and FPGAs are intended to serve as example embodiments only.

Selected ones of the routines in the JBits API manipulate an in-memory copy of configuration data downloaded (or yet to be downloaded) to an FPGA. The in-memory copy of the configuration data is referred to herein as "cache configuration data". In the course of executing the run-time reconfiguration application, selected portions of the cache configuration data are updated by the application logic. A record that identifies the updated portions is kept by the JBits API. Thus, when the application initiates reconfiguration of the FPGA via the API, the API references the record of updated portions to minimize the data that are downloaded to the FPGA. Since the API tracks the updated portions of the configuration data, the application logic is simplified and the developer can focus development efforts on areas other than reducing reconfiguration speed.

Figure 1:
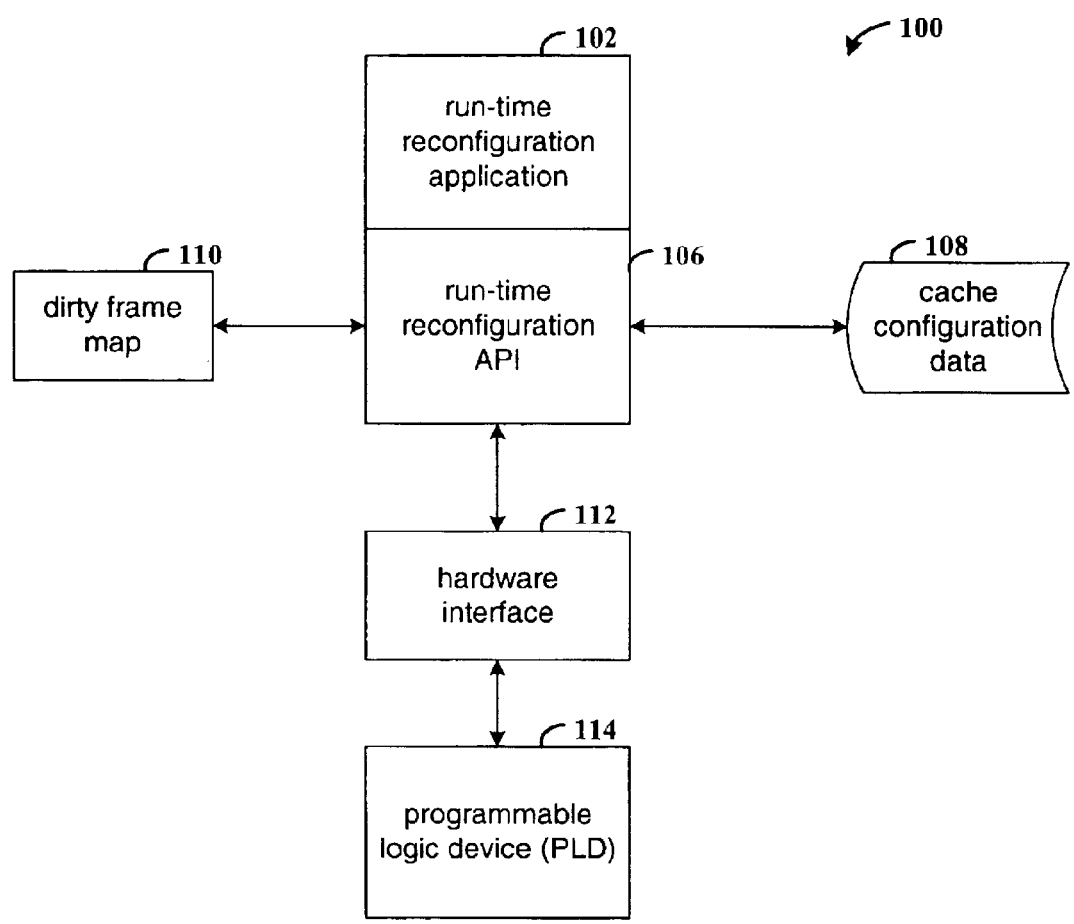
FIG. 1 is a functional block diagram of a reconfigurable computing arrangement in accordance with one embodiment of the invention.

FIG. 1 is a functional block diagram of a reconfigurable computing arrangement 100 in accordance with one embodiment of the invention. Arrangement 100 includes a run-time reconfiguration application program 102 that is written in the Java® language, for example. The application 102 may be written to perform various functions relative to the environment in which arrangement 100 is used. For example, in addition to configuration and/or runtime reconfiguration of PLD 114, the application may be programmed to provide user-interface functions.

Run-time reconfiguration API 106 allows application 102 to manipulate configurable resources of PLD 114. The bit-level interface also includes a set of functions, one or more of which are invoked when the user application program 204 references the application program interface. Application 102 and API 106 are hosted by a conventional data processing arrangement.

While not shown, it will be understood that API 106 is provided with a core library that includes a collection of macrocell or "core" generators which are implemented as Java classes. The cores are generally parameterizable and relocatable within a device. Examples of cores include counters, adders, multipliers, constant adders, constant multipliers, flip-flops and other standard logic and computation functions.

The application 102 uses API 106 to establish configuration data to be downloaded to PLD 114 and download the configuration data to PLD 114 at an application-selected time. The configuration data is shown as "cache" configuration data 108 since the data comprise an in-memory copy of the configuration data present in PLD 114. In-memory refers to memory that is accessible to application 102, either directly or via a network connection.

API 106 maintains dirty frame map 110 to record which portions of PLD 114 need to be reconfigured relative to the state of cache configuration data 108. As application 102 calls API 106 to update cache configuration data 108, the API updates dirty frame map 110 to record which portions of the PLD require reconfiguration when application 102 initiates reconfiguration. Likewise, when application 102 calls API 106 to readback configuration data, the data are stored as cache configuration data 108 and the corresponding entries in dirty frame map 110 are cleared to indicate that reconfiguration is unnecessary.

Different PLDs will have different units that support partial reconfiguration of the device. For example, a frame is the smallest set of configurable logic elements that can be changed in partially reconfiguring a virtex FPGA. A frame includes the configurable elements associated with a column of CLBs in an FPGA. In one embodiment, dirty frame map 110 is a bitmap of entries that correspond to the frames of the FPGA. The state of an entry indicates whether the corresponding frame is dirty or clean.

Hardware interface 112 includes a portable layer of software and accompanying hardware to couple application 102 to PLD 114. For example, in one embodiment hardware interface 112 is the Xilinx Hardware Interface (XHWIF).

Figure 2:
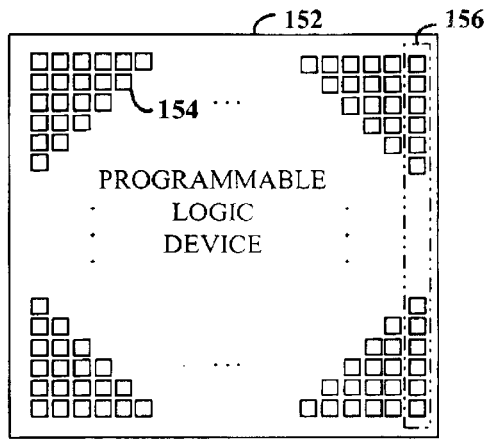
FIG. 2 is a block diagram of an example programmable logic device.

FIG. 2 is a block diagram of an example programmable logic device (PLD) 152. Virtex FPGAs are examples of PLDs that include a matrix of configurable logic blocks (CLBs), each CLB configurable to implement a desired logic function. For example, block 154 represents one CLB of an FPGA. While not shown, it will be appreciated that an FPGA also includes configurable routing resources, block RAM, and input/output resources.

Column 156 is an example frame. While frames are specific to Virtex FPGAs, it will be appreciated that different PLDs will have different minimal units of reconfigurability. Frames are used herein for illustrative purposes. Therefore, it will be understood that the teachings herein are equally applicable to partially reconfigurable PLDs that have different units of minimal reconfigurability.

The methods provided by API 106 track which frames have been modified in the course of executing application 102. When application 102 initiates reconfiguration, the API selectively partially reconfigures the PLD using the dirty frame map. The processing performed by selected ones of these methods is described in the flowcharts of FIGS. 3–6.

Figure 3:
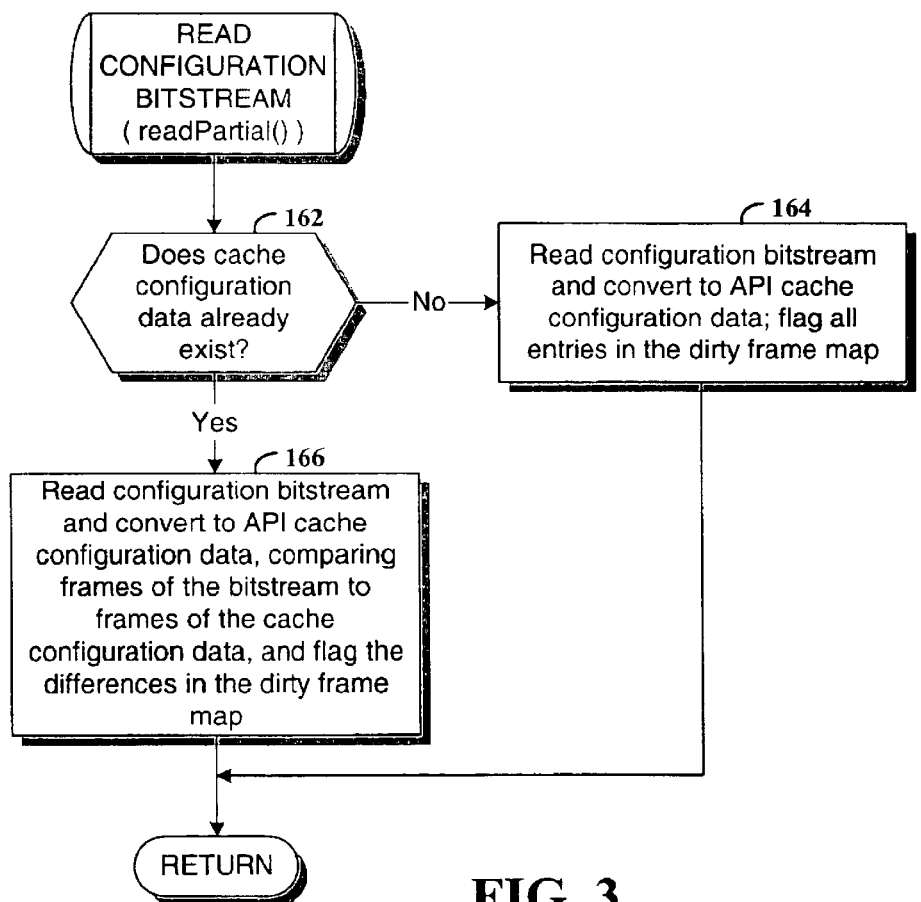
FIG. 3 is a flowchart of a process for reading a configuration bitstream into memory of a run-time reconfiguration application.

FIG. 3 is a flowchart of a process for reading a configuration bitstream into memory of a run-time reconfiguration application in accordance with one embodiment of the invention. JBits provides the readPartial ( ) method to applications for reading a configuration bitstream from a specified source. For example, if a configuration bitstream was created from a static design process, the bitstream can be read into a run-time reconfiguration application. The readPartial method generally reads and parses a specified configuration bitstream and writes the configuration bitstream as cache configuration data 108.

Decision step 162 tests whether cache configuration data already exists. If not, the process is directed to step 164, where the specified configuration bitstream is read and converted into the API's cache configuration data format. Since prior to reading the configuration bitstream there was no cache configuration data, all entries in the dirty frame map are flagged as dirty. When the PLD is reconfigured (or initially configured), all the cache configuration data is used.

If cache configuration data 108 has already been established by the application 102, the process is directed to step 166. At step 166, the specified configuration bitstream is read and converted into the API's cache configuration data format. In the conversion process, the bitstream is compared to the previous cache configuration data, and differences are flagged in the dirty frame map 110. Since configuration data already exist, only the frames that correspond to the configuration data that changed in reading the configuration bitstream need to be flagged as dirty. After manipulating the dirty frame map, the method returns control to the calling application.

Figure 4:
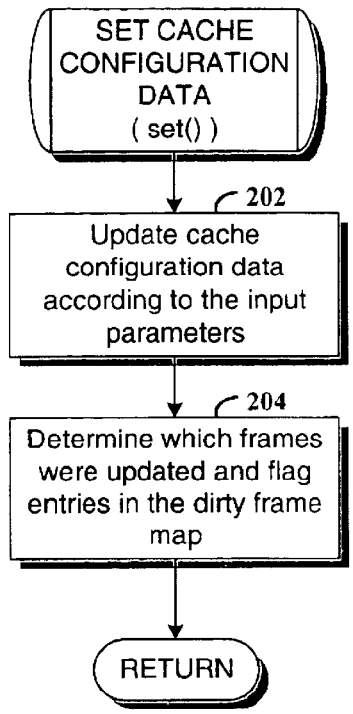
FIG. 4 is a flowchart of a process for updating cache configuration data in the memory of the run-time reconfiguration application.

FIG. 4 is a flowchart of a process for updating cache configuration data in the memory of a run-time reconfiguration application. JBits provides the set( ) method to applications for modifying selected portions of cache configuration data 108.

At step 202, the set( ) method updates the cache configuration data in accordance with input parameters provided by the application 102. The particular parameters depend on the resources of the FPGA that are to be reconfigured in the next partial reconfiguration.

At step 204, the process determines which frames of the FPGA correspond to the cache configuration data modified by the method and marks the corresponding entries in the dirty frame map as dirty. The method then returns control to the calling application.

Figure 5:
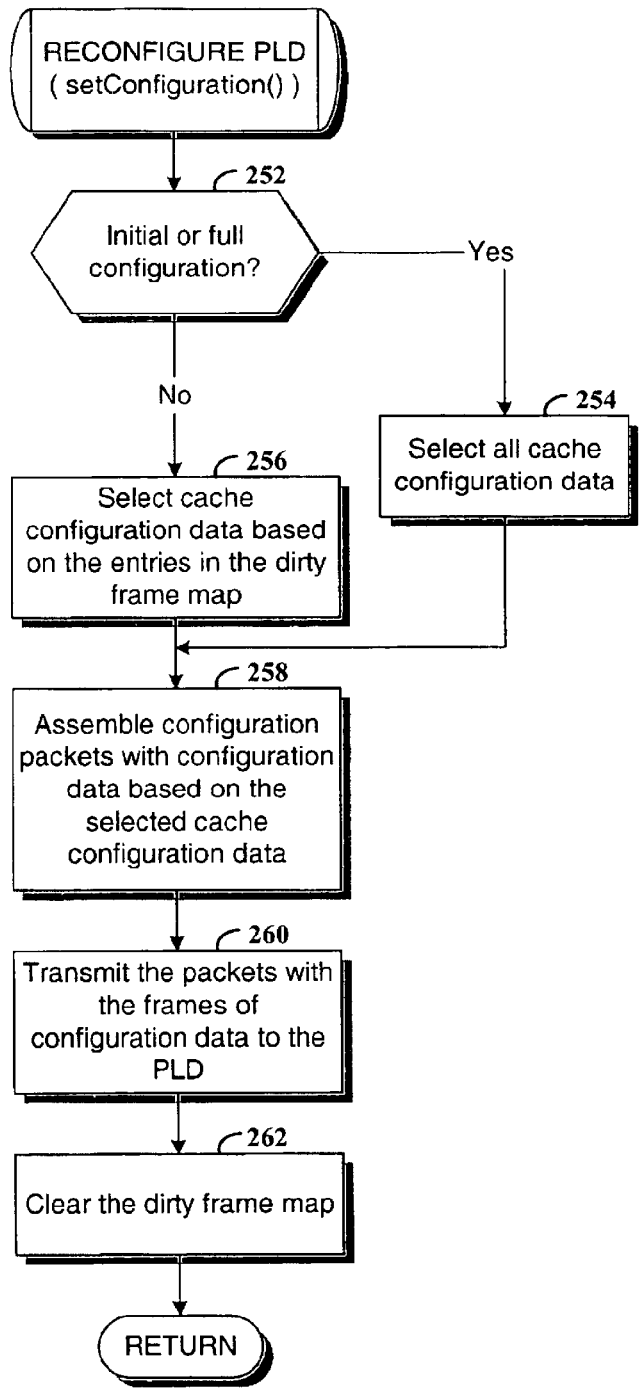
FIG. 5 is a flowchart of a process for reconfiguring a programmable logic device with data from the memory of the run-time reconfiguration application.

FIG. 5 is a flowchart of a process for reconfiguring a programmable logic device with data from the memory of the run-time reconfiguration application. JBits provides the setConfiguration( ) method to applications for fully or partially reconfiguring an FPGA. To use the setConfiguration( ) method, the application provides an input parameter that specifies whether a full or partial reconfiguration is to be performed.

Decision step 252 tests whether the FPGA has been previously configured or whether the application specified a full configuration. For initial and full configurations, the process proceeds to step 254 where all the cache configuration data is selected for configuring the FPGA. For partial reconfiguration, the process proceeds to step 256 where the cache configuration data that corresponds to frames designated in the dirty frame map 110 are selected. After the data are selected, the process continues at step 258.

At step 258, the selected configuration data are assembled into packets for transmission to the FPGA. It will be appreciated that Virtex FPGAs implement a packet-based approach for configuration. The packet-based approach entails transmission of packets that include frame addresses and configuration data to be stored in the referenced frames. At step 262, the entries in the dirty frame map are cleared, and control is then returned to the application.

Figure 6:
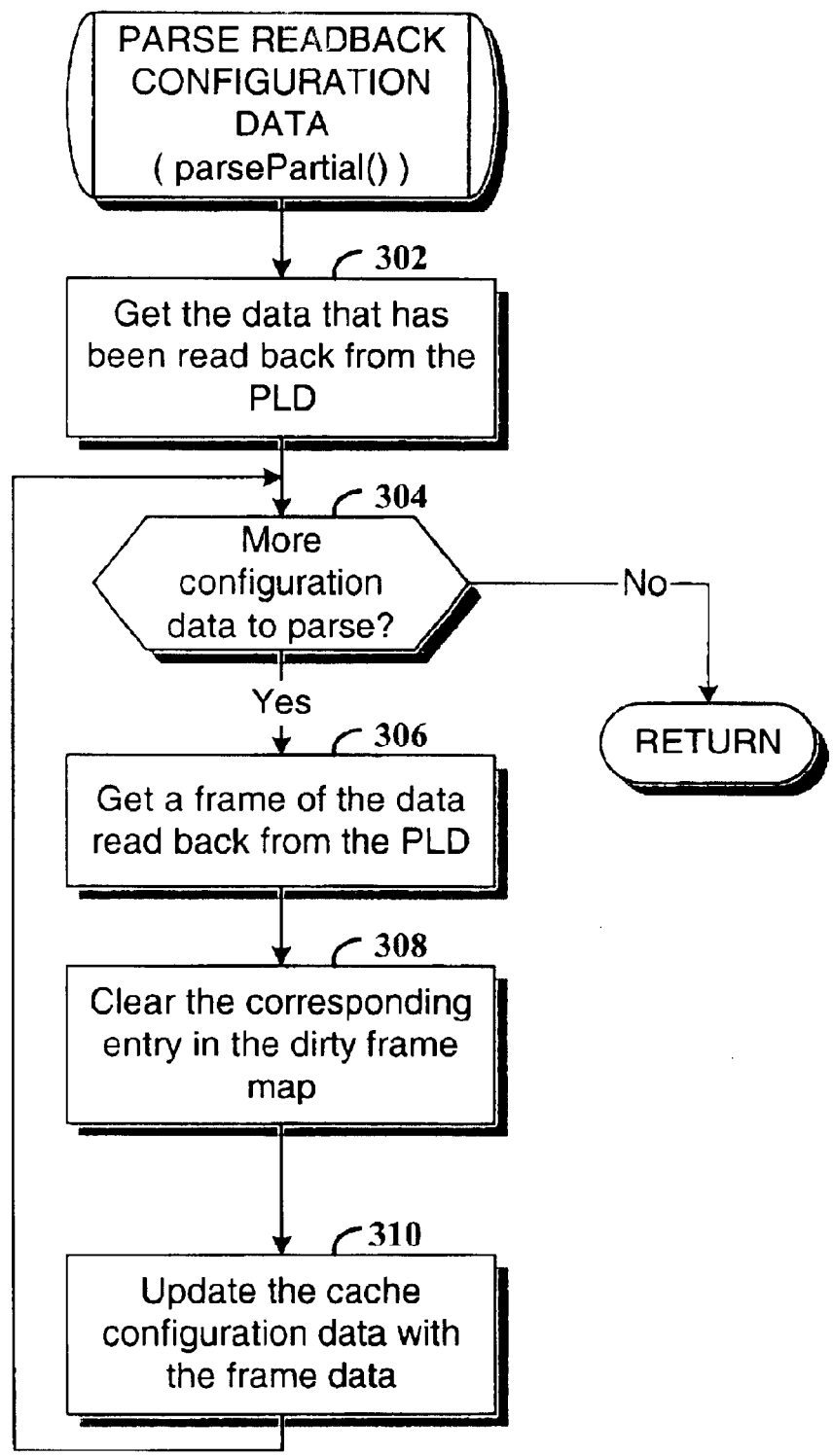
FIG. 6 is a flowchart of a process for parsing configuration data read back from a programmable logic device into memory of the run-time reconfiguration application.

FIG. 6 is a flowchart of a process for parsing configuration data read back from a programmable logic device into memory of the run-time reconfiguration application. The JBits API provides the parsePartial( ) method to applications for parsing data that have been read back from an FPGA. The parsePartial( ) method parses the data for storage as the API's cache configuration data 108 and selectively clears entries in the dirty frame map.

At step 302, the process gets the data that were read back from the FPGA by another JBits method. Decision step 304 controls a loop that parses the configuration data frame-by-frame. While there are more configuration data to parse, decision step directs the process to step 306. At step 306, the process gets a frame of data read back from the FPGA. At step 308, the corresponding entry in the dirty frame map is cleared to indicate that the cache configuration data is synchronized with the configuration of the FPGA. Finally, the frame of data formatted to the API's format for cache configuration data and stored in application memory. The process then returns to decision step 304 to test for more readback configuration data. When all the readback configuration data have been processed, control is returned to the calling application.

The two examples below illustrate usage of the JBits API in partially reconfiguring and reading back data from an FPGA. The XHWIF hardware interface is used to read and write the configuration data from and to the FPGA. However, it will be appreciated that another transport utility could be used depending on implementation requirements. Code that handles exceptions is not shown in the interest of brevity. Comments that describe the code are interspersed in the code segments.

The code segment below illustrates the JBits methods invoked in partially reconfiguring an FPGA.

```
/* Initialize the JBits object */
JBits jBits=new JBits(deviceType);
/* Read the bitstream. */
jBits.readPartial(inputfile);
/* Send the present configuration to the board (using
 * the XHWIF interface represented by board object).
 * Note that since this is an initial configuration, a
 * full configuration of the FPGA will be performed.
 */
board.setConfiguration(device), jBits.getPartial( ));
* data. */
jBits.set( . . . );
jBits.set(. . . );
/* Write the new cache configuration data to the FPGA.
 * This will consist of ONLY changes made
 * between the last getPartial( ) and now. */
board.setConfiguration (device, jBits.getPartial( ));
```

The code segment below illustrates the JBits methods invoked in reading back configuration data from an FPGA.

```
/* Initialize the JBits object */
JBits jBits=new JBits(deviceType);
/* Read the bitstream. */
jBits.readPartial(inputfile);
/* Send the present configuration to the FPGA. */
board.setConfiguration(device, jBits.getPartial( ));
/* Step the board 10 times. */
board.clockStep(10);
/* Send a readback command for the entire CLB
 * configuration */
readbackcommand=ReadbackCommand.getClbConfig
   (deviceType);
board.setConfiguration(device, readbackCommand);
/* Get the returned readback data from the FPGA */
readbackData=board.getConfiguration(device,
   ReadbackCommand.getReadLength( )*4);
/* Parse the readback data into the cache configuration
 * data */
jBits.parsePartial(readbackCommand, readbackdata);
```

The present invention is believed to be applicable to a variety of systems for run-time reconfiguration of PLDS and has been found to be particularly applicable and beneficial with application programs developed from run-time reconfiguration of FPGAs. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method for run-time reconfiguration of a programmable logic device (PLD) that is coupled to a host data processing arrangement, the host configured with a run-time reconfiguration programming interface, comprising:

executing on the host arrangement a run-time reconfiguration program that, via the programming interface, specifies a circuit design, generates configuration data that implements the circuit design on the PLD, and configures the PLD with the configuration data;

saving a copy of the configuration data on the host arrangement via the programming interface;

activating the PLD;

updating selected portions of the configuration data via the programming interface;

designating portions of the configuration data changed in the updating step as dirty portions by the programming interface; and automatically selecting the dirty portions of the configuration data by the programming interface for partially reconfiguring the PLD responsive to the run-time reconfiguration program.

2. The method of claim 1, further comprising in response to a programming interface call made by the run-time reconfiguration program:

reading back selected portions of configuration data from the PLD as readback data;

updating the copy of the configuration data on the host arrangement with the readback data;

designating portions of the copy of the configuration data changed with the readback data as clean portions; and in subsequent partial reconfiguration of the PLD, bypassing the clean portions in selecting configuration data for the PLD.

3. The method of claim 2, further comprising in response to a programming interface call made by the run-time reconfiguration program:

reading from a designated source configuration data corresponding to selected programmable portions of the PLD, wherein the configuration data from the designated source is read-in data;

updating the copy of the configuration data on the host arrangement with the read-in data; and designating portions of the copy of the configuration data changed with the read-in data as dirty portions.

4. The method of claim 3, further comprising in response to a programming interface call made by the run-time reconfiguration program:

selecting the dirty portions from the copy of the configuration data;

assembling one or more packets, each packet containing a configuration command and at least one of the dirty portions; and transmitting the one or more packets to the PLD.

5. The method of claim 4, wherein the PLD includes a plurality of configurable logic blocks (CLBs) and is partially configurable in units of one or more frames, each frame including a plurality of CLBs, further comprising establishing a dirty frame map in memory of the host arrangement, wherein a value of each entry in the map indicates whether a corresponding frame of the PLD is dirty.

6. The method of claim 1, further comprising in response to a programming interface call made by the run-time reconfiguration program:

reading from a designated source configuration data corresponding to selected programmable portions of the PLD, wherein the configuration data from the designated source is read-in data;

updating the copy of the configuration data on the host arrangement with the read-in data; and designating portions of the copy of the configuration data changed with the read-in data as dirty portions.

7. The method of claim 6, further comprising in response to a programming interface call made by the run-time reconfiguration program:

selecting the dirty portions from the copy of the configuration data;

assembling one or more packets, each packet containing a configuration command and at least one of the dirty portions; and transmitting the one or more packets to the PLD.

8. The method of claim 7, wherein the PLD includes a plurality of configurable logic blocks (CLBs) and is partially configurable in units of one or more frames, each frame including a plurality of CLBs, further comprising establishing a dirty frame map in memory of the host arrangement, wherein a value of each entry in the map indicates whether a corresponding frame of the PLD is dirty.

9. The method of claim 1, further comprising in response to a programming interface call made by the run-time reconfiguration program:

selecting the dirty portions from the copy of the configuration data;

assembling one or more packets, each packet containing a configuration command and at least one of the dirty portions; and transmitting the one or more packets to the PLD.

10. The method of claim 9, wherein the PLD includes a plurality of configurable logic blocks (CLBs) and is partially configurable in units of one or more frames, each frame including a plurality of CLBs, further comprising establishing a dirty frame map in memory of the host arrangement, wherein a value of each entry in the map indicates whether a corresponding frame of the PLD is dirty.

11. An apparatus for run-time reconfiguration of a programmable logic device (PLD) that is coupled to a host data processing arrangement, comprising:

means for executing a run-time reconfiguration program that includes executable code that specifies a circuit design, generates configuration data that implements the circuit design on the PLD, and configures the PLD with the configuration data;

means for saving a copy of the configuration data on the host arrangement;

means for activating the PLD;

means for updating selected portions of the configuration data via execution of the run-time reconfiguration program;

means for designating updated portions of the configuration data as dirty portions; and means for automatically selecting the dirty portions of the configuration data for partially reconfiguring the PLD responsive to the run-time reconfiguration program.

12. A run-time reconfigurable processor arrangement, comprising:

a programmable logic device; and a host data processing arrangement coupled to the programmable logic device and configured with a run-time reconfiguration program and a run-time reconfiguration programming interface, wherein the run-time reconfiguration program includes executable code that invokes the programming interface to specify a circuit design, generate configuration data that implements the circuit design on the PLD, and configures the PLD with the configuration data; and wherein the programming interface is further configured, responsive to calls from the run-time reconfiguration program, to save a copy of the configuration data, activate the PLD, update selected portions of the configuration data, designate updated portions of the configuration data as dirty portions, and automatically select the dirty portions of the configuration data for partially reconfiguring the PLD.

13. The arrangement of claim 12, wherein the programming interface is further configured, responsive to calls from the run-time reconfiguration program, to read back selected portions of configuration data from the PLD as readback data, update the copy of the configuration data on the host arrangement with the readback data, designate portions of the copy of the configuration data changed with the readback data as clean portions; and bypass the clean portions in selecting configuration data for the PLD in subsequent partial reconfiguration of the PLD.

14. The arrangement of claim 12, wherein the programming interface is further configured, responsive to calls from the run-time reconfiguration program, to read from a designated source configuration data corresponding to selected programmable portions of the PLD, wherein the configuration data from the designated source is read-in data, update the copy of the configuration data on the host arrangement with the read-in data, and designate portions of the copy of the configuration data changed with the read-in data as dirty portions.

15. The arrangement of claim 12, wherein the programming interface is further configured, responsive to calls from the run-time reconfiguration program, to select the dirty portions from the copy of the configuration data, assemble one or more packets, each packet containing a configuration command and at least one of the dirty portions, and transmit the one or more packets to the PLD.

16. The arrangement of claim 12, wherein the PLD includes a plurality of configurable logic blocks (CLBs) and is partially configurable in units of one or more frames, each frame including a plurality of CLBs, wherein the programming interface is further configured, responsive to calls from the run-time reconfiguration program, to establish a dirty frame map in memory of the host arrangement, wherein a value of each entry in the map indicates whether a corresponding frame of the PLD is dirty.

* * * * *